Nov. 4, 1969

C. C. DE PEW 3,476,285

FILLER CAP ASSEMBLY

Original Filed Dec. 28, 1967

INVENTOR.
CHESTER C. DE PEW
BY:

JOHN P. CHANDLER

HIS ATTORNEY.

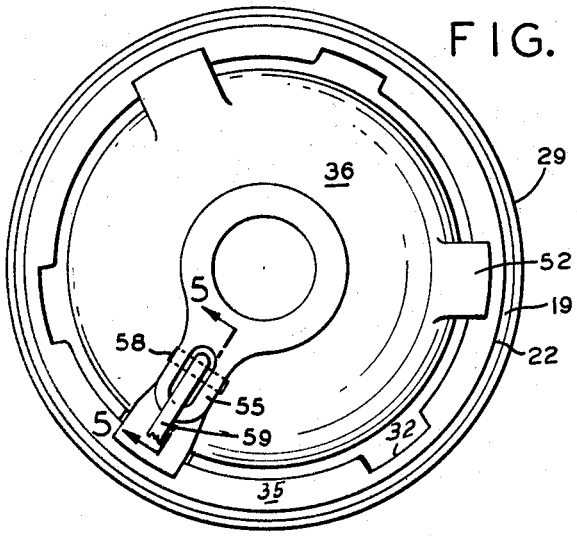
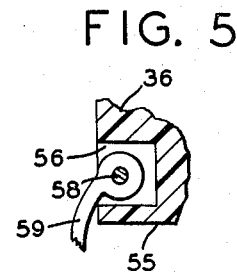
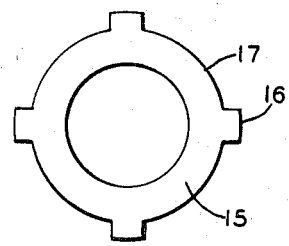
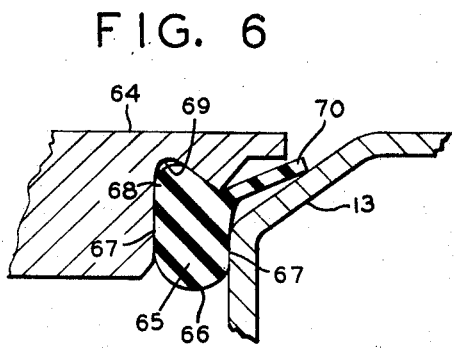

United States Patent Office 3,476,285
Patented Nov. 4, 1969

3,476,285
FILLER CAP ASSEMBLY
Chester C. De Pew, Farmingdale, N.Y., assignor to
Tridair Industries, Redondo Beach, Calif.
Continuation of application Ser. No. 698,682, Dec. 28,
1967. This application Nov. 27, 1968, Ser. No. 785,004
Int. Cl. B65d 45/02
U.S. Cl. 220—25        11 Claims

ABSTRACT OF THE DISCLOSURE

Safety factor of aircraft fuel tanks by providing edge of filler cap assembly with spaced fingers permitting electrical discharge to the adjoining edge of the adapter which receives the assembly while leaving gaps between the members to permit ionized air under heavy pressures to be discharged harmlessly to the atmosphere.

---

Figure 1:
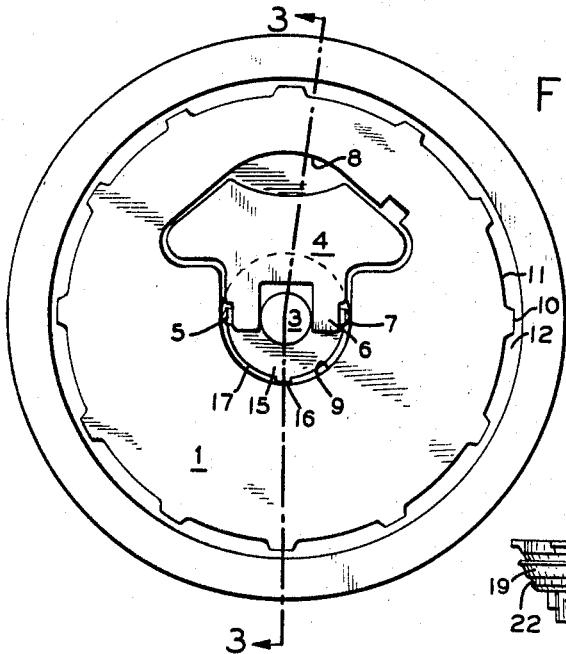

This application is a continuation of Ser. No. 698,682, filed Dec. 28, 1967, now abandoned, which is a continuation-in-part of Ser. No. 552,148, filed May 23, 1966, now abandoned, which in turn was a continuation-in-part of Ser. No. 501,628, now Patent No. 3,343,707.

This invention relates to a filler cap assembly used in conjunction with a metal adapter ring for fuel tanks in aircraft. The invention relates more particularly to an improved cap construction having a greater safety factor against fatalities caused by electrical discharges produced by static electricity, lightning or other electrical sources igniting vapors in the tank, than existing caps.

An important object of the invention is to provide a novel configuration of a tank closure cap or plate wherein any electrical charge capable of causing a spark must necessarily occur on the outside of the tank and thus be conducted harmlessly to ground.

This is achieved by providing a closure plate of special configuration wherein the diameter of said plate, relative to the adjoining curved sections of the adapter ring, when the assembly is in closed and sealed relation, has been reduced to allow as much open area as possible for blast dissipation while retaining a plurality of spaced contact fingers kept very close to the adapter to provide a minimum air gap for dissipation of any electrical charge. This configuration includes a plurality of protruding fingers around the outer periphery of the closure plate, thus providing a plurality of alternate sections of greater and lesser diameter. The greater diameter section ideally should make metal-to-metal contact with the adapter ring but in view of tolerance requirements and diameter variations it has been found desirable to provide a minimum allowable clearance. This arrangement enables the assembly to have a high safety factor since the pressure caused by ionization of the air in the annular slot between the closure cap and the adapter ring is so great that it compresses the O ring and creates a blow-by situation which can enter the tank. By forming the closure plate with arcuate sections of greater diameter and alternate arcuate sections of lesser diameter any sudden increase of pressure in this annular slot due to ionization will cause no injury to the closure cap since the gases will discharge into the area above the cap.

To further increase the safety factor, I may also employ an electrical discharge baffle with area above the O ring which performs two important functions. First it restricts any electrical arcing to the small gap between the rim of cap and the adapter at the exterior of the tank. Secondly, it protects the fluid seal from being damaged by electrical discharge pressure and bits of hot molten metal produced by electrical arcing. It also prevents electrical sparks caused by an electrical discharge entering the cavity just above the tank and fluid seal.

An annular retainer ring of plastic supports the lower edge of the O ring and the function of this plastic retainer, besides supporting the O ring and retaining the fluid seal, is to create a greater gap between metallic parts of the cap and the metal adapter, on the inside of the tank.

Another danger area associated with conventional caps is around the central vertical shaft which is sealed at a point below the upper face of the closure caps by an O ring and between this face and the O ring in an annular cavity. This cavity is subject to a high velocity spark or air pulse when a flash of lightning occurs above the closure assembly. In accordance with the present invention an insulating gasket is placed in this cavity which assures against the possibility of a spark or ionized air under pressure passing downwardly to the center of the tank.

Figure 2:
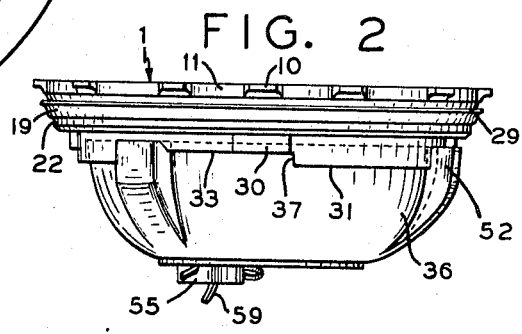
Figure 3:
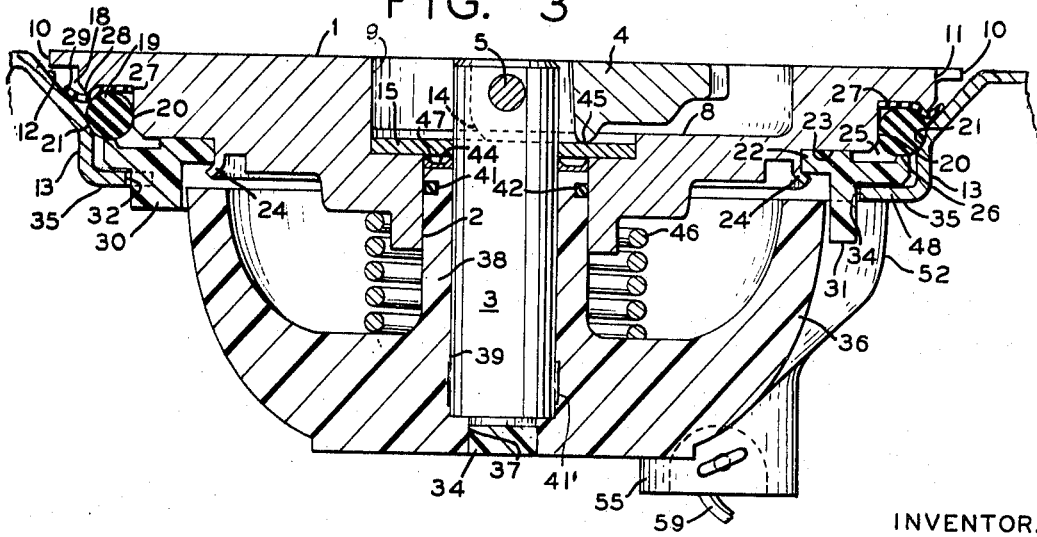

In the drawings:
FIG. 1 is a plan view of a closure plate embodying the present invention;
FIG. 2 is a side elevation thereof with the parts shown in closed position;
FIG. 3 is an enlarged section taken on line 3—3 of FIG. 1;
FIG. 4 is a bottom plan view of the closure cap of the present invention;
FIG. 5 is a broken section taken on line 5—5 of FIG. 4;
FIG. 6 is a broken section showing a modified sealing arrangement;
FIG. 7 is a plan view of the wear ring for the cam section of the handle.

The filler cap assembly of the present invention includes a closure plate 1 which may be formed from metal and is provided with a central opening 2 forming a bearing for a pressure plate carried on a shaft 3. This shaft carries a handle 4 at its upper end supported by a pivot pin 5 passing through spaced ears 6 and the opposed ends of the pin are preferably cone shaped as shown at 7. The upper face of the closure plate has a recess 8 of irregular shape to receive the handle in flush relation when parts of the cap are in closed position. The recess includes a central semi-circular section 9 of smaller proportions than the main section 8 and the sections opposed cone-shaped terminal 7 of the pivot pin are closely spaced from or may even touch the vertical walls of said central semi-circular section 9. The outer periphery of the closure plate is not truly circular as in devices of the prior art but rather is characterized by alternate sections of greater diameter and lesser diameter indicated, respectively, at 10 and 11. Sections 10 have such a diameter that their peripheries are normally spaced as close as the adjoining inclined rim 12 of the adapter ring shown at 13, when the cap assembly is in closed and sealed position, as manufacturing tolerances will permit. Ideally, these peripheral fingers 10 should be long enough in a radial direction to actually touch the adapter ring except that the metal-to-metal contact might cause binding during closing of the cap.

The extent to which the intermediate sections 11 are of lesser diameter is dictated solely by the need to provide a gap of sufficient width between these sections and the adapter ring as to enable any discharge of ionized air in the confined area 18 under the fingers 10 to have free access to the open area above the filler cap and thus prevent the build-up of pressures high enough to blast the edges of the closure cap upwardly and all out of shape. An optimum distance is about .015". The difference in these distances is shown in exaggerated form in FIG. 3.

As is usual in filler cap assemblies, the handle has a curved cam surface 14 on its lower face which operates against a wear plate 15, with a central opening for a shaft, to pull the shaft upwardly when the handle is moved from the vertical, open position to the horizontal closed position shown. The outer periphery of the wear plate similarly has alternate sections of greater diameter 16 and lesser diameter 17 for the same reason that the rim of the closure plate is so contoured.

A resilient ring 19 to effect the actual fluid seal between the cap and the adapter ring secured to the tank (not shown) is received in a recess 20 which is right angular in cross section and engages the curved annular corner section 21 of the adapter in sealing relation. The O ring is held in firm engagement with the upper annular wall of the recess 20 by a ring 22 of plastic or other insulating material seated in a recess 23 which is right angular in cross section and which is retained in the seat by an annular lip 24 which is rolled over. The ring 22 has a recess 25 on its upper face near its outer margin which leaves a narow annular seat 26 for supporting the O ring 19. This arrangement permits the fluid sealing O ring to be displaced partly into the recess 25 in the case of O ring swell.

Above the fluid sealing ring is a circular ring 27 of insulating material to form an annular electrical baffle and this ring, which was initially flat, is coned downwardly and retained by an annular rib 28 formed on the lower surface of the closure plate 4. The outer margin 29 of the ring is normally flat but is shown in the position it occupies when the cap is in contact with the adapter and is, therefore, curled slightly upwardly around its outer margin.

Retainer ring 22 of insulating material has a plurality of downwardly extending lugs 30 which form part of an annular flange 33 which extends clear around the lower face of the retainer. The outer diameter of the flange is such as to readily move into the central opening 34 in the adapter ring. The lugs extend further outwardly in a radial direction than does the flange and when the filler cap is initially moved into the adapter for sealing, the lugs pass through slots 32 in the lower annular wall of the adapter 13. Closure of the tank is effected by a cup shaped pressure plate 36 preferably molded or machined from plastic material and formed at its center with a hub 38 which extends upwardly almost to wear plate 15 and is provided with a central vertical bore 39 which receives for the shaft 3 in secured, non-rotating relation. The upper section of the hub has an annular recess 41 to receive a resilient ring 42 for fluid sealing purposes. In this fashion, there is no possibility of any arcing occurring on the tank side of the resilient ring 42 as a result of a pressure blast past this ring.

At the upper end of hub 38, there is positioned an initially flat sealing ring 44 formed of resilient insulating material and whose cross sectional width is greater than the annular space between shaft 3 and a central bore 2 in the closure cap. Thus, when the sealing ring 44 is moved downwardly into the annular recess its innner and outer peripheral edges are curled upwadly as shown at 47. The outer diameter of hub 38, relative to central opening 2 is such as to provide a tight fit between the parts without, however, preventing free rotation of the pressure plate. Shaft 3 has a force fit in vertical bore 39 since the shaft must not rotate relative to the pressure plate.

The lower end of bore 39 in the pressure plate 36 has a counterbore 37 which receives a head 34 of shaft 3 and any suitable means, such as keys, may be employed to secure the shaft against rotation in bore 39.

On its outer periphery, the pressure plate has lugs 52 which are aligned with lugs 30 of ring 22 when the cap is first placed in the adapter. This alignment is effected by turning the handle, the shaft and the pressure plate in a counter-clockwise direction and the rotation is stopped by any suitable means such as a shoulder 37 leading to a deeper section 31 of the flange. The lugs 52 of the pressure plate are now aligned just below the lugs 30 and the lugs 52 pass through slots 32 and below the lower wall 35 of the adapter ring while lugs 30 on the retainer ring pass into slots 32 and stay there.

If there are three sets of lugs 52 and slots 32, there will also be three deeper sections 31 which form the shoulders or stops 37 at one end thereof. At the other end of the deeper flange section, there is another shoulder (not shown) which limits rotation in the other direction when the closure cap has been turned about 45° to move clamping lugs 52 away from slots 32, after which the handle is moved down to the position of FIG. 3 where a boss 45 on the handle contacts wear plate 15 and the seal is complete. The filler cap is made captive when removed from the tank by providing a boss 55 extending from the pressure plate, the boss having a slot 56 which receives pin 58 which secures a lanyard 59 suitably secured inside the tank. When in unlocked position, the pressure plate 36 is urged downwardly relative to the cap by a spring 46.

Instead of providing the separate O ring 19 for the fluid seal and another ring 27 to form the electrical baffle these two elements may be combined, as shown in FIG. 6. The closure cap 64 has a liquid sealing ring 65 of irregular configuration with a curved lower surface 66, substantially parallel side edges 67 and upper inner portion 68 which extends into an annular V-shaped slot 69 and an annular wing portion 70 which is moved upwardly under a bending stress when placed in adapter ring 13.

By providing the fingers 10 which almost touch the adapter ring, any electrical discharge from the cap passed to the adapter ring to the skin and hence to the ground. The more frequent source of difficulty is in the area 18 under the fingers wherein a sudden dissipation of energy ionizes the air in the immediate area of the discharge which results in a sudden increase of high localized pressure. This has frequently produced a "blast" effect which bends the outer margin of the closure plate upwardly, thus destroying the seal, the tank and usually the craft as well. The present seal effectively prevents this as it also prevents a "blow by" situation which occurs when the blast, instead of blowing the margin of the cap upwardly, moves down past the O ring and into the tank with equally disastrous result. Sealing ring 27, overlying a portion of the face of the adapter, effectively prevents this, and sealing the perimeter and ring 44 and O ring 42 around the shaft is equally effective to prevent this at the center. Electrical discharge may take place between the coned ends 7 of the pin 5, and the sides of recess 9 in the cap and thus all of the electrical energy discharging into the wear plate prevent sparks due to electrical discharge, and the wear ring 15 having the alternate greater and lesser diameter sections have the same effect as the similar configuration at the rim of the closure cap. It also prevents electrical welding of pin 5 to the handle 4 and shaft 3.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

The embodiments of the invention in which an exclusive property or privilege is claimed are defined as follows:

1. A filler cap assembly for a fuel tank with an adapter ring to receive the assembly in secured relation and including a removable filler cap having a central bore and whose outer rim is formed with alternate sections of greater and lesser diameter, the sections of lesser diameter being spaced from the adapter ring to permit discharge of ionized air to the atmosphere, the outer edges of the sections of greater diameter forming areas for electical discharge to the adapter ring, a pressure plate of insulating material rotatable within the filler cap bore, said pressure plate being formed with lugs which underlie the adapter ring when the assembly is rotated to closed position.

2. A filler cap assembly for a fuel tank with an adapter ring to receive the assembly in secured relation and including a removable filler cap having a central bore and whose outer rim is formed with alternate sections of greater and lesser diameter, the sections of greater diameter almost tounching the adapter ring, a resilient fluid sealing ring below said rim, a retaining ring formed of insulating material below the sealing ring for retaining the latter, a pressure plate of insulating material formed with a central hub having a bore therein and extending up through the filler cap bore and being rotatable therein, said pressure plate being formed with lugs which underlie the adpater ring when the assembly is rotated to closed position, a shaft secured in non-rotative relation in the pressure plate bore to rotate the pressure plate and lugs to said closed position, a handle pivoted at the top of the shaft and formed with a cam to urge the plate upward to clamping position, and a wear plate for the cam.

3. The structure recited in claim 2 wherein a seal ring forming an electrical discharge baffle extends outwardly in the area between the sealing ring and said rim.

4. The structure recited in claim 2 wherein the handle when in closed position is substantially flush with the upper face of the filler cap.

5. The structure recited in claim 2 wherein the upper face of the filler cap has a central recess for the wear plate and the latter has spaced sections around its margin which substantially touch the filler cap, and alternate sections of lesser diameter.

6. The structure recited in claim 2 wherein the seal ring is formed integrally with the fluid sealing ring.

7. The structure recited in claim 2 wherein the upper end of the hub is spaced from the wear plate and an annular seal ring is positioned in said space.

8. The structure recited in claim 2 wherein the upper end of the hub has an annular slot and an O ring is positioned in said slot.

9. The structure recited in claim 2 wherein lanyard of insulated material is secured at one end thereof to the filler cap and at the other end at a point inside the tank.

10. The structure recited in claim 3 wherein said annular seal ring is initially flat and of a width in cross section which is greater than the annular space which receives it so that the edges of said sealing ring are curled upwardly.

11. The structure recited in claim 2 wherein the filler cap has a recess to receive the handle and the pivot which supports the handle at the upper end of the shaft is a pin whose ends are coned and substantially touch the opposed sides of the recess.

References Cited

UNITED STATES PATENTS

| | | | |
|---|---|---|---|
| 3,391,817 | 7/1968 | Shaw | 220—25 |
| 3,351,226 | 11/1967 | Hogan et al. | 220—25 |
| 3,343,707 | 9/1967 | De Pew et al. | 220—25 |
| 3,289,876 | 12/1966 | De Pew | 220—25 |
| 3,280,372 | 10/1966 | De Pew | 317—2 |
| 3,276,615 | 10/1966 | De Pew | 220—25 |

GEORGE T. HALL, Primary Examiner

U.S. Cl. X.R.

317—2